No. 673,888. Patented May 14, 1901.
R. M. PHILLIPS.
FRICTION CLUTCH.
(Application filed Oct. 6, 1899. Renewed Apr. 19, 1901.)
(No Model.) 2 Sheets—Sheet I.
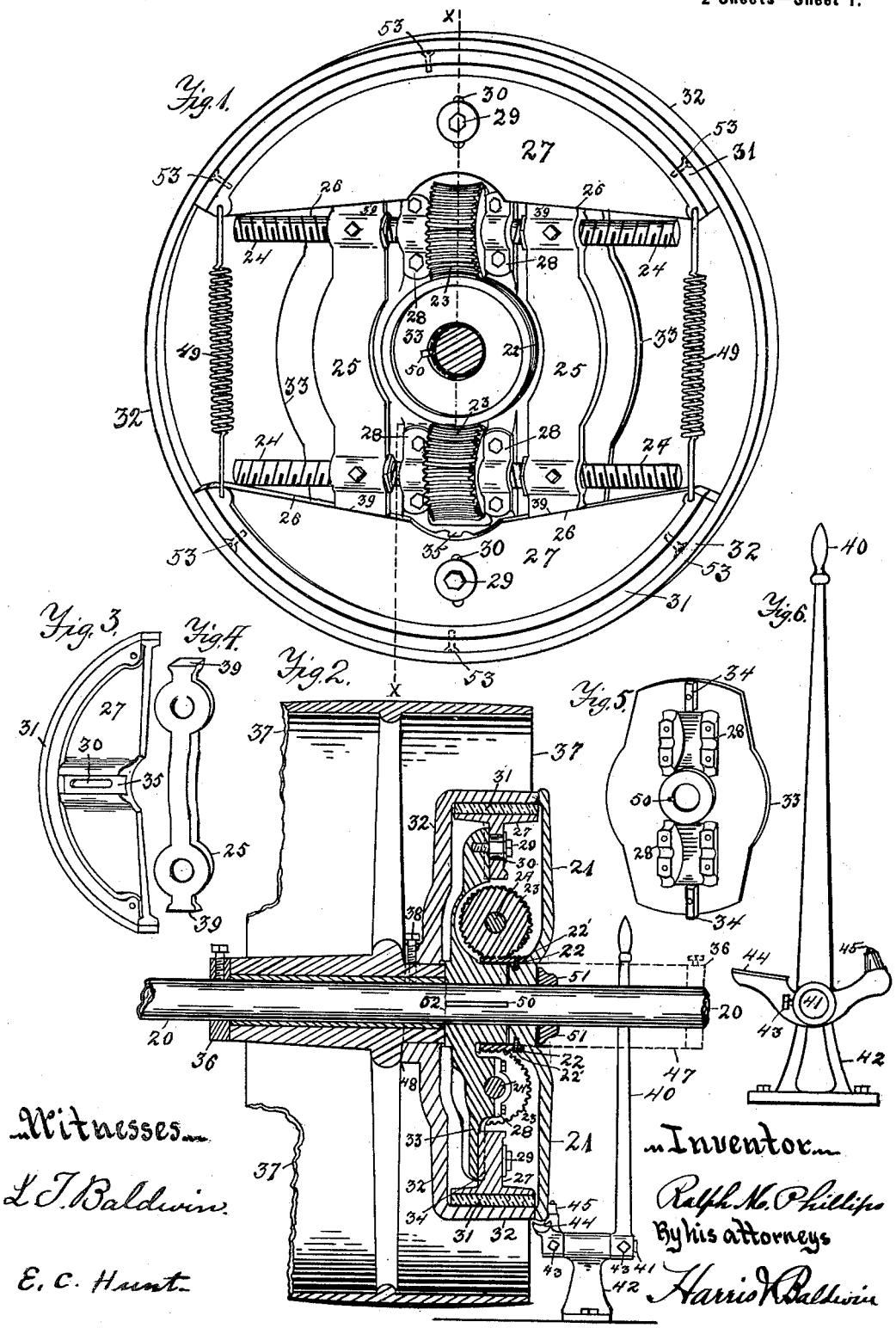

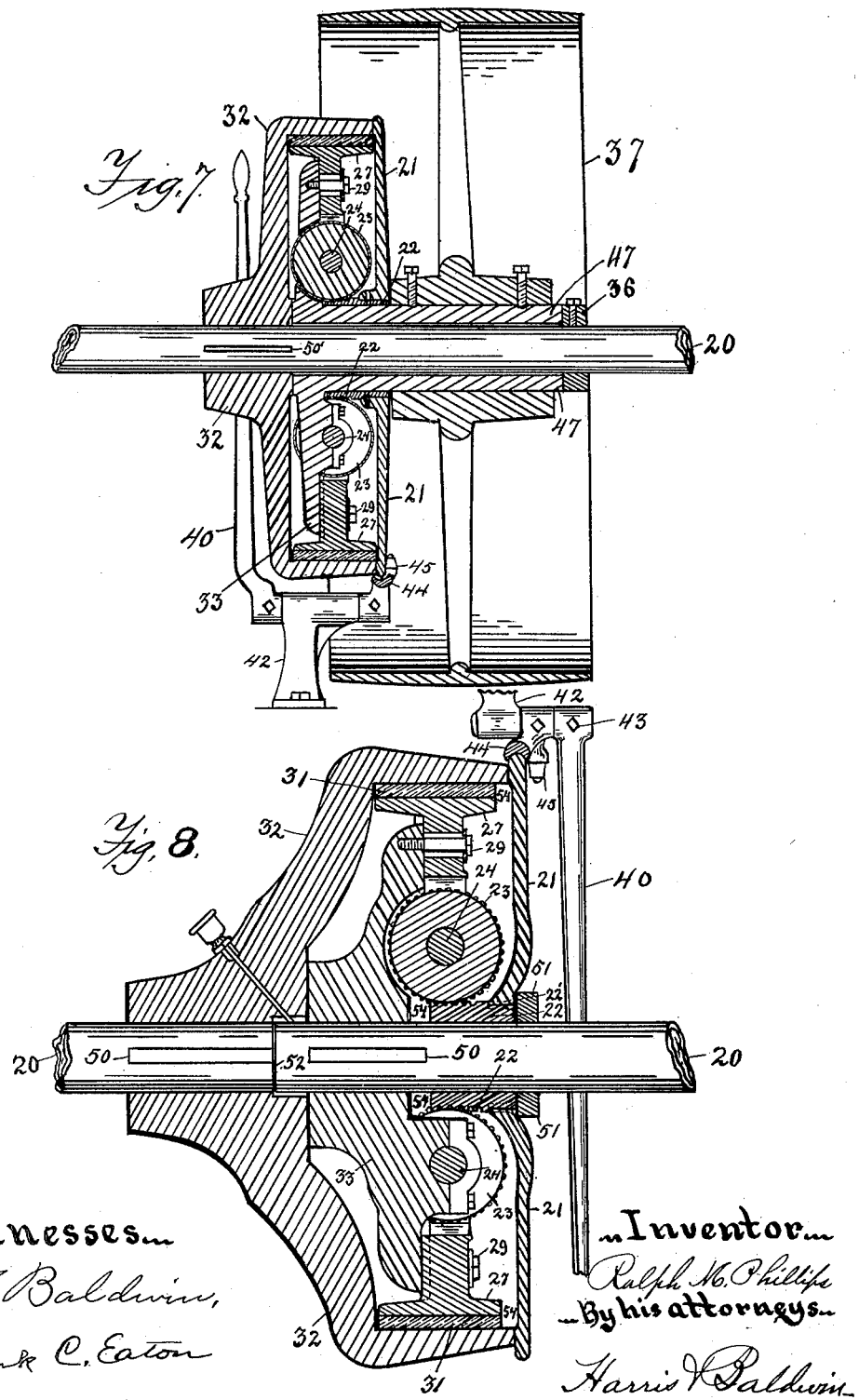

UNITED STATES PATENT OFFICE.

RALPH M. PHILLIPS, OF JAMESTOWN, NEW YORK.

FRICTION-CLUTCH.

SPECIFICATION forming part of Letters Patent No. 673,888, dated May 14, 1901.

Application filed October 6, 1899. Renewed April 19, 1901. Serial No. 56,652. (No model.)

*To all whom it may concern:*

Be it known that I, RALPH M. PHILLIPS, a citizen of the United States, and a resident of Jamestown, in the county of Chautauqua and State of New York, have invented a new and useful Friction-Clutch, of which the following is a specification.

My invention relates to friction-clutches for starting, holding in clutch, and stopping light and heavy machinery; and the object of my improvement is the use of new mechanism for obtaining the grip in a clutch in which a worm, worm-gears, right-and-left screws, wedges working between the converging ways of friction-blocks, and the parts of the clutch-shell are used in such a manner that, first, the clutch after bringing the two parts of the shell in contact is self-acting—*i. e.*, the driving power causes it to wind itself up and complete its grip; second, when thus starting it is also self-adjusting—*i. e.*, the pull of the load turns the worm and screws to just the right point to hold and carry said load; third, it can easily be adjusted without stopping, so that it will release itself and slip rather than cause breakage under extra strain; fourth, the power can be applied from pulley to shaft, from shaft to pulley, or from shaft to shaft; fifth, it occupies little space on the shaft; sixth, it is started and stopped at high or low speed with perfect ease and with no sidewise thrust on the shaft, and, seventh, it is smooth on the outside of the shell, having no projections to catch the clothing when turning, and thus comes under the factory laws. I attain these objects by mechanism illustrated in the accompanying drawings, in which—

Figure 1 is a side perspective view of clutch with side plate left off and showing shaft in section. Fig. 2 is a sectional view at line X X in Fig. 1 of clutch attached to a driving-pulley. Fig. 3 is a perspective view of the back side of friction-block. Fig. 4 is a detail view of wedge. Fig. 5 is a side elevation of central plate on which the gearing is mounted. Fig. 6 is a side elevation of lever, brake, and starting-cone. Fig. 7 is a sectional view at line X X in Fig. 1 of clutch attached to a driving-shaft. Fig. 8 is a sectional view at line X X in Fig. 1 of clutch as adapted for a cut-off coupling.

Similar numerals refer to similar parts in the several views.

20 is the shaft.

21 is the front or friction plate of the clutch-shell, to which is fastened worm 22 by screws 22' 22', so that plate 21 controls the starting and stopping of worm 22.

23 23 are worm-gears which are mounted to work on opposite sides of worm 22. Right-and-left screws 24 24 are fastened in gears 23 23 and work in boxes 28 28 28 28 on central plate 33 and also work in wedges 25 25, forcing them out or drawing them in, according as the clutch is applied or released. I find that a worm-gear on each side of the worm and two screws in each wedge so balance the action of the parts that the worm never binds, but works freely backward or forward. I therefore extend each wedge across two screws to bear on the converging ways 26 26 of friction-blocks 27 27, and the ends 39 39 of each wedge are cut at the same angle as the converging ways, so that when wedges 25 25 are forced out by screws 24 24 friction-blocks 27 27 are forced out against rim 32 of the shell.

Friction-blocks 27 27 are made in the form of an arc on their outer edge to fit the inner side of rim 32 and are attached to plate 33 by screw-bolts 29 29 in slots 30 30, which slots allow the friction-blocks sufficient play to be forced out and drawn back in working the clutch. Projections 34 34 on plate 33 work in sliding ways 35 35 on the back side of friction-blocks 27 27 and keep the friction-blocks in line, preventing their turning to either side. Springs 49 49 draw back the friction-blocks when the clutch is released and prevent all rattling.

31 is a shoe attached by screws 53 53 53 over the arc side of friction-block 27 to increase the friction or grip. Set-collar 36 holds the pulley in place on the shaft and in conjunction with a key in key-seats 50 holds the clutch and pulley in position on the shaft. Set-collar 51 acts as a stop for plate 21 and worm 22 when the clutch is released. Part 32 is attached to driving-pulley 37 by set-screw 38 or to driving-shaft 20' by key in order that part 32 may run free with the power.

40 is the starting-lever, which is fastened to one end of shaft 41 in base 42 by set-screw 43, and to the other end of shaft 41 is attached two arms, one of which bears the revoluble starting-cone 45, which presses plate 21 against revolving part 32 of the shell to start the clutch to wind up, the worm and gears finishing the grip of the clutch, and the other arm extends out in brake-shoe 44, which retards or stops the clutch by bearing on the edge of plate 21.

My clutch is shown in Fig. 2 as arranged to transmit the power from pulley 37 to shaft 20, and when not in clutch pulley 37 and part 32 of the shell run free or turn with the power without affecting the clutch. My clutch as arranged to transmit the power from a driving-shaft to a pulley is shown in Fig. 7, part 32 being extended to the shaft and keyed thereto in order that it may run free with the shaft, for this is necessary for the successful working of my clutch. The center plate 33 is made with a long sleeve 47, which extends out through plate 21 on shaft 20 and is held in place by set-collar 36. Pulley 37 is fastened to this sleeve by set-screw. Worm 22 works around this sleeve and is fastened to plate 21, as in Fig. 2.

To unite or couple two shafts and make what is called a "cut-off coupling" with my clutch is shown in Fig. 8. The two ends of the shafts are shown at 52, and each part of the clutch is keyed to its part of the shaft, the part 32 always being attached to the driving-shaft; but I find that plenty of play should be allowed the friction-blocks and worm, as at 54 54, because of the liability of longitudinal vibration of the shafts.

To operate my clutch, cone 45 is pressed gently for a moment against the side of plate 21 by lever 40. This presses plate 21 against the revolving part of the shell 32, and the friction causes plate 21 and worm 22 to revolve, and the worm winds up the clutch-turning gears 23 23 and right-and-left screws 24 24, forcing out wedges 25 25 and friction-blocks 27 27 until the blocks grip against the inside of rim 32, the load or pull of the machine turning up the worm just sufficiently to obtain a complete grip and carry the load, the draw of worm 22 on gears 23 23 gradually increasing the friction of plate 21 on part 32 as the load is gradually taken up, so that the two parts of the shell hold as one piece until released. Thus it will adjust itself to either a heavy or light load and is ready for any extra strain. To release the clutch, brake 44 is pressed on the edge of plate 21 until it and the worm cease to revolve, gears 23 23 pulling in the wedges and releasing friction-blocks 27 27. I find, however, that if brake 44 is pressed for only a moment on plate 21 it is retarded somewhat and separates from part 32 slightly, and the clutch will stand at that point in its gripping power to which it had been forced when the brake was applied, and the clutch will then slip if an extra load is put upon it. It will be noticed that this is done almost instantly and without stopping the clutch and is of special value in saving the breaking of machinery; but if left tight any extra strain only turns the worm the tighter, and its grip is limited only by the breaking power of the clutch-shell.

It is evident that all which is necessary to make the clutch self-acting is to put plate 21 in or out of contact with revolving part 32 of the shell. As soon as the two parts touch the friction begins and the worm is revolved and gradually increases its power, winding up the clutch until the grip is complete and the load is run at full speed, and when the brake is applied the worm releases the grip of the clutch. The clutch is therefore self-acting. It will be recognized also that I can vary the time of starting and stopping according to the pitch which I give the threads on the worm and screws or the angle on the wedges and ways. Since it is self-adjusting to its load, the amount of speed does not affect my clutch.

Other forms of friction-blocks and wedges might be used and not depart from my invention. The members working the expansion in my clutch would work perfectly on the inside of the rim of small pulleys, the pulley taking the place of part 32 of the shell.

I claim as new—

1. In a friction-clutch, a worm on a revoluble plate having suitable means for turning the same, worm-gears working in said worm, screws secured in said gears, wedges working on said screws, friction-blocks, and a revoluble clutch-rim, as shown and described.

2. In a friction-clutch, a worm on a revoluble plate having suitable means for turning the same, a central plate having screws mounted thereon, worm-gears secured on said screws, wedges operated by said screws, friction-blocks, and a coöperating clutch member.

3. In a friction-clutch, a worm having means for turning the same, worm-gears working on opposite sides of said worm, right-and-left screws secured in said gears, wedges operated by said screws, friction-blocks which converge toward their outer ends on their inner edges, and a coöperating clutch member, as shown and described.

4. In a friction-clutch, a worm mounted on a revoluble plate having suitable means for turning the same, a central plate secured to the shaft, right-and-left screws mounted on said central plate at right angles to the line of shaft, worm-gears secured on said screws to work in said worm, friction-blocks that converge toward their outer ends on their inner edges and having connecting-springs, wedges operated by said screws between said converging edges, and a coöperating clutch-shell, as shown and described.

5. In a friction-clutch, a worm having suitable means for turning the same, a central plate extending out in a sleeve around the shaft, a pulley secured to said sleeve, right-and-left screws mounted on said plate, worm-gears secured on said screws to turn the same, wedges operated by said screws, friction-blocks, and a coöperating clutch-shell secured to the shaft, as shown and described.

6. In a friction-clutch having a cylinder to hold the expansion mechanism, segment friction-blocks that converge toward each other at their respective outer ends on their inner edges, having suitable means to press the segments against the cylinder, as shown.

7. In a friction-clutch having a cylinder to hold the expansion mechanism, friction-blocks which converge toward each other at their respective outer ends on their inner edges, wedges between said converging ways and having suitable means to drive the same, as shown.

8. A friction-clutch consisting of driving and driven members, the driven member composed of expansive segments having converging inner edges, wedges interposed between said segments to press out the same; a worm, worm-gears and screws to operate said wedges.

9. A friction-clutch consisting of a shell in two parts, the rim part attached to the driving power, the side plate loosely mounted around the shaft and provided with means to press the loose side plate against the rim-plate, a worm on said side plate, gears working on said worm, a central plate having screws mounted thereon, wedges operated by said screws, friction-blocks having ways on their inner edges which converge toward each other at their respective outer ends and friction-shoes on their outer edges to press against the rim of the shell, the side plate having a starting and stopping lever suitably mounted near the edge of the side plate, said lever provided with cone-pulley to press the side plate against the revolving rim of the shell to start the clutch and a shoe to press against the edge of the side plate to stop the clutch, as shown and described.

10. A friction-clutch consisting of a shell in two parts 21 32, part 32 keyed to the driving power and part 21 having worm 22 secured thereto, central plate 33 having right-and-left screws 24 24 mounted thereon in boxes 28 28, worm-gears 23 23 secured on said screws to work in said worm, friction-blocks 27 27 having converging ways 26 26 on their inner edges and shoes 31 31 on their outer edges, said friction-blocks having connecting-springs 49 49, wedges 25 25 on said screws between said converging ways, lever 40 having brake-arm 44 and starting-cone 45 in suitable mounting to start and stop side plate 21 and the clutch, as shown and described.

In testimony whereof I have subscribed my name to this specification in the presence of two subscribing witnesses.

RALPH M. PHILLIPS.

Witnesses:
N. E. THOMAS,
S. J. GILES.